United States Patent Office 2,723,357
Patented Nov. 8, 1955

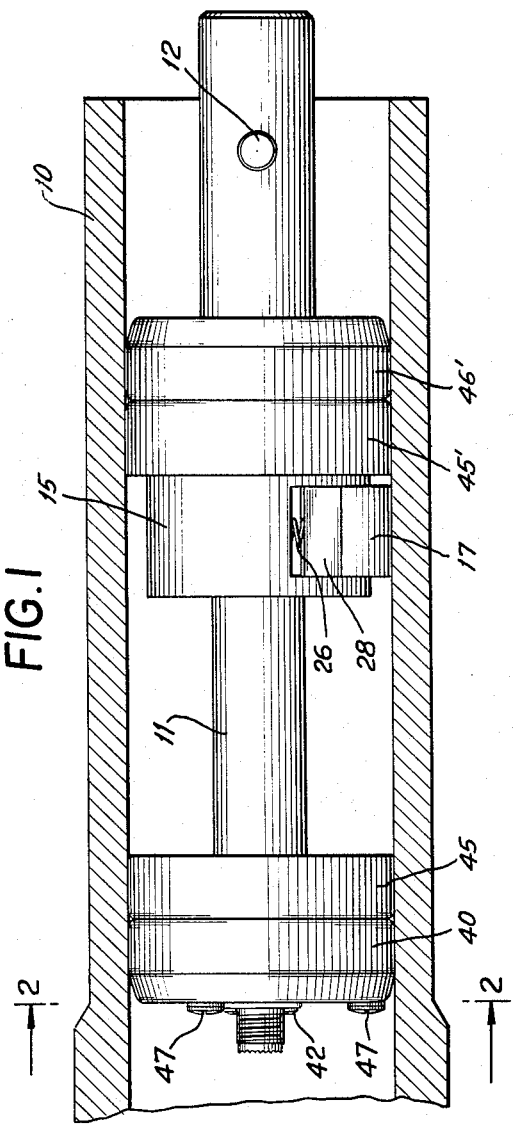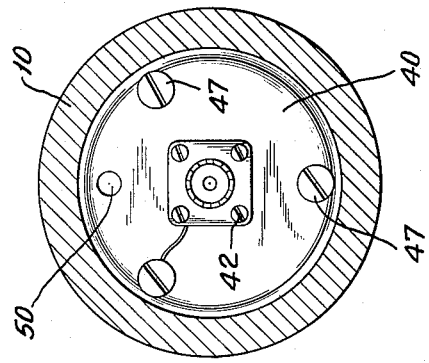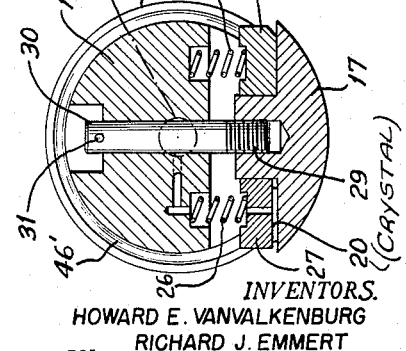

2,723,357

SEARCH UNITS FOR ULTRASONIC INSPECTION SYSTEMS

Howard E. Van Valkenburg, Candlewood Isle, Conn., and Richard J. Emmert, Pawling, N. Y., assignors to Sperry Products, Inc., Danbury, Conn., a corporation of New York Application January 6, 1953, Serial No. 329,914

1 Claim. (Cl. 310—8.7)

This invention relates to the search units of ultrasonic inspection systems for use in the inspection of tubular articles such as guns, in which it is desirable to transmit the ultrasonic vibrations from within the bore of the tube. In such inspection systems the search unit must traverse the interior of the bore in a close spiral path so that the entire volume of the tube may be tested. The transmission of ultrasonic vibrations into the tube is accomplished by means of a piezo-electric element in the form of a quartz crystal which makes contact with the inner wall of the tube through a contact member or shoe which takes the wear.

In order that the vibrations of the crystal and its shoe may be transmitted into the tube without appreciable attenuation during the movement of the search unit, it is necessary to main a couplant in the form of a liquid between the shoe and the wall of the tube. Various means to accomplish this result have been proposed, among these being total immersion of the tube under inspection in a liquid medium, filling the entire bore of the tube with liquid, and immersing the search unit in a flowing stream of liquid. All of these are cumbersome, time-consumnig methods involving the use of large quantities of coupling medium.

It is therefore the principal object of this invention to provide a search unit of the type described which will have means for providing a continuous supply of coupling liquid to the search unit shoe, while utilizing a relatively small quantity of liquid with minimium loss throughout the inspection of the entire bore.

Further objects and advantages of this invention will become apparent in the following detailed description thereof.

In the accompanying drawings,

Fig. 1 is a side elevation of an ultrasonic search unit embodying this invention, the search unit being shown in position within the bore of a tube which has been sectioned vertically.

Fig. 2 is an end elevation of the Fig. 1 device.

Fig. 3 is a partial vertical section through the Fig. 1 device.

Fig. 4 is a section taken substantially on the line 4—4 of Fig. 3.

Referring to the drawigns, there is shown an ultrasonic search unit adapted for use in the interior of a tube 10, which may be, for example, a gun barrel, which is to be tested for defects. As shown, the unit comprises a support which takes the form of a shaft-like member 11 near one end of which is formed a pin 12 adapted for connection to the boring bar of a lathe so that the search unit may be fed axially while the tube 10 is rotated by reason of its mounting on the lathe spindle. The member 11 may be provided with a housing section 15 having a hollow chamber 16 such that section 15 is adapted to operate a shoe 17 curved to fit the interior wall of the tube under inspection and having means for carrying the electro-acoustic transducer which transmits ultrasonic vibrations into the wall of the tube. Said transducer may be a piezoelectric element in the form of a quartz crystal 20 mounted on a flat surface at the rear of the shoe 17 and connected to a source of electric vibrations of ultrasonic frequency, said source not being shown. The crystal 20 may be vibrated by said electric vibrations by means of conductors which extend through the hollow interior 25 of the member 11 to cause the crystal to vibrate mechanically at the ultrasonic frequency and transmit such vibrations through shoe 17 into the wall of the tube. The shoe 17 may be held against the wall of the tube by means of springs 26 engaging the fixed block 15 at one end and engaging blocks 27 and 28 at the other end, said blocks engaging the crystal and shoe respectively to push the shoe outwardly. The shoe is connected by screw thread engagement 29 with a post 30 slidable within the housing 15 and having a pin 31 for limting the outward movement.

The shoe is thus held firmly in engagement with the inner wall of the tube, and if the member 11 is fed axially into the tube while the tube is being rotated, it will be apparent that the shoe will traverse a spiral path which can be made to cover practically the entire volume of the tube. As stated in the introduction hereto, the problem which presents itself in such devices is to maintain efficient coupling between the shoe and the tube so that maximum power, in the form of mechanical vibrations, is transmitted into the tube without appreciable attenuation. Such attenuation takes place when even slight roughness of surface is encountered or slight loss of contact takes place as a result of the vibrations. Therefore the various means enumerated in the introduction hereto have been employed for maintaining a liquid couplant between the shoe and the wall of the tube, but as already mentioned, all such former methods called for the use of large quantities of liquid and cumbersome methods of operation. By the following method which is employed in the search unit herein described, a minimum of liquid will accomplish this desirable result of providing an adequate coupling medium without appreciable loss of liquid and with a simple construction.

To accomplish the purpose described in the preceding paragraph, the support or shaft-like member 11 is provided one one end thereof with an end member 40 fixed to the flanged end 41 of member 11 by means such as screws 42. A second end member 40' is mounted on the member 11 on the other side of housing 15 from member 40. The end members 40 and 40' are substantially the same diameter as the interior of the bore of tube 10. Between end member 40' and one side of housing 15 there is fixed a liquid-containing cup-shaped flexible washer 45' which may be of leather. The washer is held firmly in engagement with the interior wall of tube 10 by means of a spring 46'. The washer is held in position by means of studs 47' extending through end member 40', a gasket 48', and into the housing 15. On the inner surface of end member 40 there is attached a similar washer 45, spring-pressed by spring 46 into engagement with the interior wall of the tube. The washer is fixed to the end member 40 by means of stud 47 extending through end member 40 and into washer 48. It will be seen that the space between the flexible washers 48 and 48' comprises a fluid-tight compartment, so that if this compartment is partially filled with liquid to the height of blocks 27 and 28, the shoe 17 will be supplied with liquid couplant throughout the movement of the search unit within the bore of tube 10. The fluid chamber thus established is relatively small and requires a relatively small amount of liquid. Furthermore the firm sliding engagement of the washers with the inner wall of the bore of tube 10 insures relatively little loss of liquid throughout the movement of the search unit within the bore.

To fill with liquid the chamber thus established between the washers, there may be provided a filler opening 50 extending through end member 40 and washer 48, which filler opening may be closed in any suitable manner, by a plug or similar device, or if the search unit is maintained in the position shown in Fig. 3, i. e., with the filler opening at the top, no closure is necessary because the chamber does not have to be completely filled with liquid but only with sufficient liquid to enclose the shoe 17.

Having described our invention, what we claim and desire to secure by Letters Patent is:

An ultrasonic search unit adapted to extend into the bore of a tube, said unit comprising a support adapted to extend axially into said bore, an electro-acoustic transducer assembly carried by said support in engagement with the inner wall of the tube, said assembly comprising a shoe movable radially with respect to the bore of the tube, and a piezo-electric element carried by said shoe displaced from the radial axis of movement of the shoe whereby the acoustic beam from said transducer enters the wall of the tube at an angle of incidence displaced from zero angle.

References Cited in the file of this patent

UNITED STATES PATENTS

| Number | Name | Date |
|---|---|---|
| 1,812,944 | Granger | July 7, 1931 |
| 2,138,036 | Kunze | Nov. 29, 1938 |
| 2,497,672 | Jaffe | Feb. 14, 1950 |
| 2,602,102 | Webb | July 1, 1952 |